(12) United States Patent
Taniguchi et al.

(10) Patent No.: US 12,739,044 B2
(45) Date of Patent: Sep. 15, 2026

(54) TRANSMISSION SPACE REPRODUCTION METHOD AND TRANSMISSION SPACE REPRODUCTION DEVICE

(71) Applicant: NTT, Inc., Tokyo (JP)

(72) Inventors: Ryotaro Taniguchi, Musashino (JP); Tomoki Murakami, Musashino (JP); Tomoaki Ogawa, Musashino (JP)

(73) Assignee: NTT, Inc., Tokyo (JP)

( * ) Notice: Subject to any disclaimer, the term of this patent is extended or adjusted under 35 U.S.C. 154(b) by 307 days.

(21) Appl. No.: 18/290,829

(22) PCT Filed: Aug. 2, 2021

(86) PCT No.: PCT/JP2021/028657

§ 371 (c)(1),
(2) Date: Jan. 22, 2024

(87) PCT Pub. No.: WO2023/012876

PCT Pub. Date: Feb. 9, 2023

(65) Prior Publication Data

US 2024/0322924 A1 Sep. 26, 2024

(51) Int. Cl.
*H04B 17/391* (2015.01)

(52) U.S. Cl.
CPC ..... *H04B 17/3912* (2015.01); *H04B 17/3913* (2015.01)

(58) Field of Classification Search
CPC .............. H04B 17/391; H04B 17/3912; H04B 17/3913
See application file for complete search history.

(56) References Cited

U.S. PATENT DOCUMENTS 8,412,112 B2 * 4/2013 Foegelle .............. H04B 17/294 455/67.11
9,615,274 B2 * 4/2017 Hansen ................. H04W 24/08
(Continued)

FOREIGN PATENT DOCUMENTS

DE 102016005513 A1 * 11/2017 ........... H04B 17/391
WO WO-2018164627 A1 * 9/2018 ......... G01R 29/0821
(Continued)

OTHER PUBLICATIONS

Jing et al., "MIMO OTA Test for a Mobile Station Performance Evaluation", IEEE Instrumentation & Measurement Magazine, vol. 19, Issue 3, Jun. 2016, pp. 43-50.

*Primary Examiner* — Hai V Nguyen
(74) *Attorney, Agent, or Firm* — XSENSUS LLP

(57) ABSTRACT

A transmission space reproduction method according to an embodiment includes: a propagation characteristics calculation step of performing simulation while sequentially changing a parameter in a reverberation chamber used to reproduce propagation characteristics so as to calculate propagation characteristics in the reverberation chamber, a machine learning step of forming a learning model for a calculated parameter by machine learning using actually measured propagation characteristics and parameters, a parameter generation step of generating a parameter corresponding to propagation characteristics to be reproduced using the formed learning model, and a reproduction execution step of controlling a channel emulator based on the generated parameter so as to perform processing of forming a transmission space having the propagation characteristics to be reproduced in the reverberation chamber.

14 Claims, 4 Drawing Sheets

(56) References Cited

U.S. PATENT DOCUMENTS 9,786,999 B2 * 10/2017 Kyosti .................. H01Q 25/00
9,813,810 B1 * 11/2017 Nongpiur ............... G06N 3/045
10,248,744 B2 * 4/2019 Schissler .............. G06V 10/764
10,313,034 B2 * 6/2019 Rodriguez-Herrera ...................... H04B 17/391
10,587,350 B2 * 3/2020 Rodriguez-Herrera ...................... H04B 17/3912
10,598,711 B2 * 3/2020 Sim .................... G01R 29/0821
10,720,965 B2 * 7/2020 Rowell .................. H01Q 1/526
10,746,775 B1 * 8/2020 Luley ..................... H01Q 15/16
10,790,915 B2 * 9/2020 DaSilva ............. G01R 31/2822
11,026,198 B2 * 6/2021 Rofougaran ........... G06N 3/044
11,115,135 B2 * 9/2021 Chen ...................... H04B 17/12
11,152,717 B2 * 10/2021 Kyosti ................... H01Q 25/00
11,153,763 B2 * 10/2021 Jung ....................... G06T 17/05
11,349,743 B2 * 5/2022 Kleider .................. G06N 20/00
11,581,917 B2 * 2/2023 Henry ..................... H01P 5/103
11,895,466 B2 * 2/2024 Chen ......................... G06T 7/73
11,962,357 B2 * 4/2024 Qi .......................... H04B 17/15
12,045,726 B2 * 7/2024 West .................... G06N 3/0475
12,625,797 B2 * 5/2026 Liou ................... G06F 11/3692
2010/0285753 A1 * 11/2010 Foegelle .............. H04B 17/294 455/67.12
2013/0052962 A1 * 2/2013 Hansen ................ G01R 29/105 455/67.12
2013/0243221 A1 * 9/2013 Hsieh .................. H04R 29/004 381/103
2016/0212242 A1 * 7/2016 Beck ....................... G06F 16/68
2018/0232471 A1 * 8/2018 Schissler ............. G06F 18/2413
2018/0262281 A1 * 9/2018 Qi .......................... H04B 17/12
2019/0103926 A1 * 4/2019 Chen .................... H04B 17/102
2019/0288748 A1 * 9/2019 Rowell .................. H01Q 1/526
2019/0349702 A1 * 11/2019 Miller ..................... H04S 7/303
2019/0356397 A1 * 11/2019 DaSilva ............. G01R 31/2822
2020/0035259 A1 * 1/2020 Thuillier ................. G10L 25/30
2020/0252318 A1 * 8/2020 Kleider .............. H04B 17/3913
2020/0264222 A1 * 8/2020 Luley ................. G01R 29/0878
2021/0084601 A1 * 3/2021 Rofougaran ........... G06N 3/044
2022/0066919 A1 * 3/2022 Liou ................... G06F 11/3692
2024/0428818 A1 * 12/2024 Nongpiur ................ G10L 25/30
2025/0070902 A1 * 2/2025 Malapati Ravindraiah ................. H04L 41/16
2025/0105898 A1 * 3/2025 Mahendra ............ H04B 7/0626
2025/0273855 A1 * 8/2025 Anim ................. H04B 7/04013
2026/0113075 A1 * 4/2026 Taniguchi .......... H04B 7/04013
2026/0128810 A1 * 5/2026 Taniguchi ............ H04B 17/391

FOREIGN PATENT DOCUMENTS

WO WO-2020127836 A1 * 6/2020 ............... H04S 7/30
WO WO-2025206184 A1 * 10/2025 ............... H04S 7/00
WO WO-2025243494 A1 * 11/2025 ............ H04W 24/02

* cited by examiner 1
2
20
21
22
22
22
23
3
4
CONTROL SERVER
CHANNEL EMULATOR

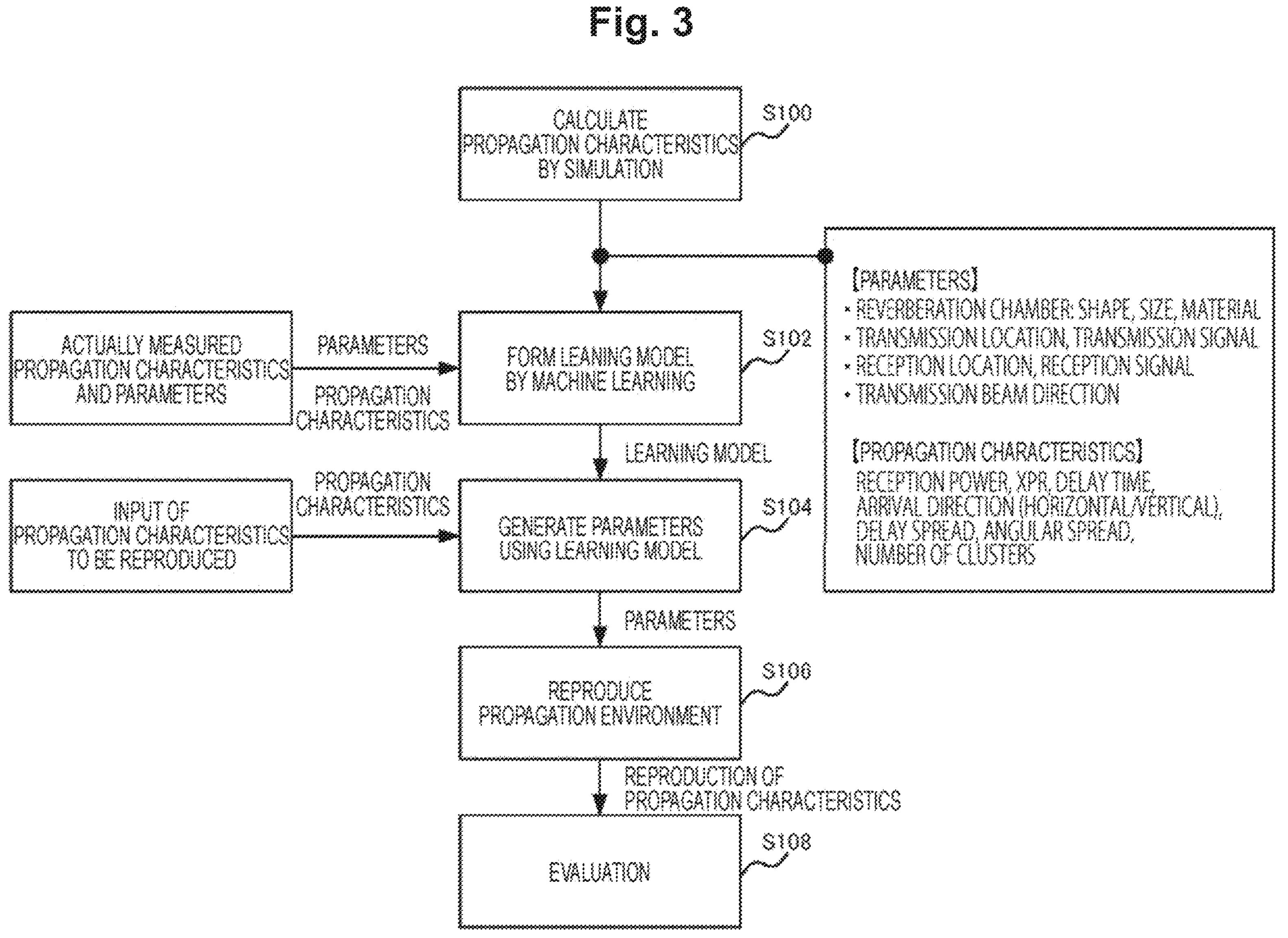
Fig. 3
CALCULATE PROPAGATION CHARACTERISTICS BY SIMULATION
S100
【PARAMETERS】
· REVERBERATION CHAMBER: SHAPE, SIZE, MATERIAL
· TRANSMISSION LOCATION, TRANSMISSION SIGNAL
· RECEPTION LOCATION, RECEPTION SIGNAL
· TRANSMISSION BEAM DIRECTION
【PROPAGATION CHARACTERISTICS】
RECEPTION POWER, XPR, DELAY TIME, ARRIVAL DIRECTION (HORIZONTAL/VERTICAL), DELAY SPREAD, ANGULAR SPREAD, NUMBER OF CLUSTERS
ACTUALLY MEASURED PROPAGATION CHARACTERISTICS AND PARAMETERS
PARAMETERS
PROPAGATION CHARACTERISTICS
FORM LEANING MODEL BY MACHINE LEARNING
S102
LEARNING MODEL
INPUT OF PROPAGATION CHARACTERISTICS TO BE REPRODUCED
PROPAGATION CHARACTERISTICS
GENERATE PARAMETERS USING LEARNING MODEL
S104
PARAMETERS
REPRODUCE PROPAGATION ENVIRONMENT
S106
REPRODUCTION OF PROPAGATION CHARACTERISTICS
EVALUATION
S108

TRANSMISSION SPACE REPRODUCTION METHOD AND TRANSMISSION SPACE REPRODUCTION DEVICE

CROSS-REFERENCE TO RELATED APPLICATION

The present application is a national stage application, pursuant to 35 U.S.C. § 371, based on International Patent Application No. PCT/JP2021/028657, filed Aug. 2, 2021, the entire contents of which are incorporated herein by reference.

TECHNICAL FIELD

The present invention relates to a transmission space reproduction method and a transmission space reproduction device.

BACKGROUND ART

Conventionally, when characteristics of a wireless terminal are evaluated, components have been individually evaluated using a wired cable. For example, in the case of evaluating the characteristics of an antenna element, wired coupling of the antenna element has been performed.

However, wireless terminals use radio waves in a millimeter wave band or have higher frequencies, and are downsized and integrated. Moreover, an antenna element or the like may not have a connector adaptable when the antenna element or the like is downsized, and thus the evaluation by wired coupling is difficult. Moreover, even when the test by wired coupling is possible, there is a problem in that the test is complicated and takes time.

Moreover, in a case where Massive MIMO is applied, or the like, it is conceivable to reproduce a propagation environment by arranging a plurality of antennas. However, because the number of antennas to be used is considerably large, there is a problem in that the realization of an ideal configuration requires costs.

In order to solve such a problem, there has been discussed reproduction of a statistical propagation model with a reflector installed in a reverberation chamber as a space for evaluating the characteristics of a wireless terminal.

For example, Non Patent Literature 1 discloses a multiple-probe anechoic chamber method (MPAC) and reverberation chamber methods (RC) as mobile station performance evaluation methods.

In the MPAC, a propagation environment is reproduced by arranging a plurality of antennas. However, the number of antennas to be used is considerably large, and an ideal configuration requires costs. In the RC, a statistical propagation model is reproduced with a reflector such as a stirring plate that is installed in a space (reverberation chamber) where radio waves reverberate.

CITATION LIST

Non Patent Literature

Non Patent Literature 1: Ya Jing, Hongwei Kong, Moray Rumney, "MIMO OTA test for a mobile station performance evaluation", IEEE Instrumentation & Measurement Magazine, Volume: 19, Issue: 3, June 2016, pp. 43-50

SUMMARY OF INVENTION

Technical Problem

However, conventionally, there has been a problem in that although it is possible to reproduce a statistical propagation model such as Rayleigh fading by reproducing a multipath environment, it is not possible to reproduce an environment in which radio waves arrive from an arbitrary direction such as a cluster model simulating an environment in which radio cells exist also in the surroundings.

The present invention has been made in view of the above-described problems, and an object of the present invention is to provide a transmission space reproduction method and a transmission space reproduction device capable of easily reproducing a transmission space.

Solution to Problem

A transmission space reproduction method according to an embodiment of the present invention is characterized in including: a propagation characteristics calculation step of performing simulation while sequentially changing a parameter in a reverberation chamber used to reproduce propagation characteristics so as to calculate propagation characteristics in the reverberation chamber, a machine learning step of forming a learning model for a calculated parameter by machine learning using actually measured propagation characteristics and parameters, a parameter generation step of generating a parameter corresponding to propagation characteristics to be reproduced using the formed learning model, and a reproduction execution step of controlling a channel emulator based on the generated parameter so as to perform processing of forming a transmission space having the propagation characteristics to be reproduced in the reverberation chamber.

Moreover, a transmission space reproduction device according to an embodiment of the present invention is characterized in including: a propagation characteristics calculation unit that performs simulation while sequentially changing a parameter in a reverberation chamber used to reproduce propagation characteristics so as to calculate propagation characteristics in the reverberation chamber, a machine learning unit that forms a learning model for a parameter calculated by the propagation characteristics calculation unit by machine learning using actually measured propagation characteristics and parameters, a parameter generation unit that generates a parameter corresponding to propagation characteristics to be reproduced using the learning model formed by the machine learning unit, and a reproduction execution unit that controls a channel emulator based on the parameter generated by the parameter generation unit so as to perform processing of forming a transmission space having the propagation characteristics to be reproduced in the reverberation chamber.

Advantageous Effects of Invention

According to the present invention, it is possible to easily reproduce a transmission space.

BRIEF DESCRIPTION OF DRAWINGS

FIG. 3 is a diagram illustrating a method of reproducing a transmission space having predetermined radio wave propagation characteristics to be reproduced in a reverberation chamber and evaluating the characteristics of a measurement object.

DESCRIPTION OF EMBODIMENTS

Figure 1:
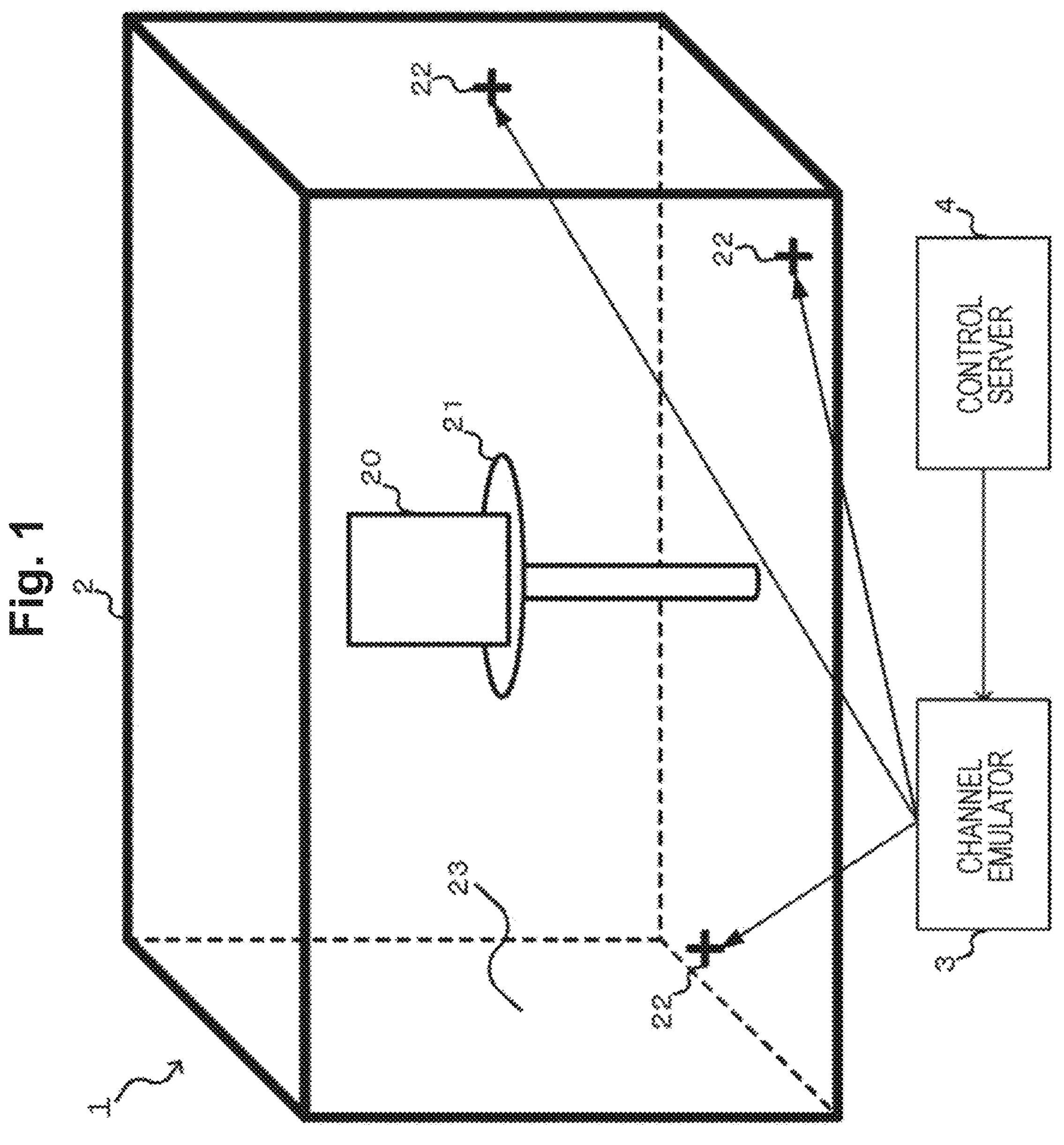
FIG. 1 is a diagram illustrating a configuration example of a transmission space reproduction device according to an embodiment.

Hereinafter, an embodiment of a transmission space reproduction method and a transmission space reproduction device will be described with reference to the drawings. FIG. 1 is a diagram illustrating a configuration example of a transmission space reproduction device 1 according to an embodiment. As illustrated in FIG. 1, the transmission space reproduction device 1 includes a reverberation chamber 2, a channel emulator 3, and a control server 4.

The reverberation chamber 2 forms a space for reverberating radio waves, and the size and the shape of the reverberation chamber 2 can be changed. For example, the reverberation chamber 2 can be formed in a shape such as a rectangular parallelepiped, a sphere, an n-hedron, an n-prism, or an n-pyramid.

Moreover, in the internal space of the reverberation chamber 2, a measurement object 20 is placed on, for example, a placing table 21. The placing table 21 is configured such that the position and the height of the measurement object 20 in the reverberation chamber 2 can be changed.

Moreover, in the reverberation chamber 2, a plurality of transmission antennas 22 are disposed on, for example, wall surfaces. In the reverberation chamber 2, the number, the positions, and the type of the transmission antennas 22 can be changed.

Moreover, a reflector 23 is disposed on a wall surface of the reverberation chamber 2. The reflector 23 may simply reflect radio waves, or may be a dynamic reflector (intelligent reflecting surface (IRS) or the like) capable of controlling phases of arrival waves when reflecting radio waves, and the type of the reflector 23 can be changed. Moreover, the reflector 23 may have a function as a radio wave absorber that suppresses (or reduces to zero) a reflection amount of radio waves.

The channel emulator 3 transmits radio waves from each of the transmission antennas 22 so as to form a radio wave transmission space accompanied by multipath, interference waves, or the like in the reverberation chamber 2.

The control server 4 is a computer or the like including a processor and a memory, and controls each unit forming the transmission space reproduction device 1.

Figure 2:
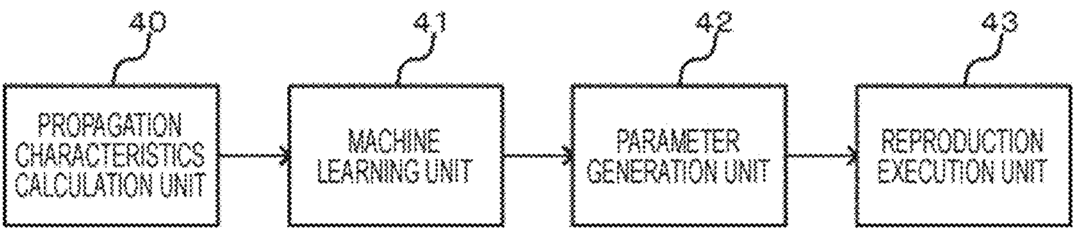
FIG. 2 is a functional block diagram illustrating functions of a control server.

FIG. 2 is a functional block diagram illustrating functions of the control server 4. As illustrated in FIG. 2, the control server 4 includes, for example, a propagation characteristics calculation unit 40, a machine learning unit 41, a parameter generation unit 42, and a reproduction execution unit 43.

The propagation characteristics calculation unit 40 performs simulation using a ray tracing method, a finite-difference time-domain method (FDTD method), or the like while sequentially changing a parameter in the reverberation chamber 2 used to reproduce the propagation characteristics by the transmission space reproduction device 1, for example, so as to calculate the propagation characteristics in the reverberation chamber 2.

The ray tracing method includes a ray launching method and an imaging method. The ray launching method is a method in which rays are discretely radiated at every predetermined angle from a transmission antenna and the trajectories of the rays are sequentially tracked so that a ray having passed through the vicinity of a reception point is regarded as a ray having reached the reception point. The imaging method is a method of determining a reflection transmission path of a ray connecting transmission and reception points by obtaining a mirror point with respect to a reflection surface. The FDTD method is a method of performing electromagnetic field analysis using Maxwell's equations in the time domain.

Then, the propagation characteristics calculation unit 40 outputs propagation characteristics and parameters used to reproduce the propagation characteristics to the machine learning unit 41. For example, the propagation characteristics are indicated by reception power, XPR (polarization ratio of incident field), delay time, arrival direction (horizontal/vertical), delay spread, angular spread, the number of clusters, and the like.

Moreover, parameters in the reverberation chamber 2 used to reproduce the propagation characteristics are, for example, the shape, size, and material of the reverberation chamber 2, the transmission location, transmission signal, and transmission beam direction by the transmission antenna 22, the reception location and reception signal by the measurement object 20, and the like.

Moreover, the propagation characteristics calculation unit 40 may perform simulation while changing parameters of the reflector 23 that is a dynamic reflector provided in the reverberation chamber 2, so as to calculate the propagation characteristics in the reverberation chamber 2.

The machine learning unit 41 forms a learning model for the propagation characteristics and parameters input from the propagation characteristics calculation unit 40 by machine learning using actually measured propagation characteristics and parameters, and outputs the formed learning model to the parameter generation unit 42.

When the propagation characteristics to be reproduced are input, the parameter generation unit 42 generates parameters corresponding to the propagation characteristics to be reproduced using the learning model input from the machine learning unit 41, and outputs the parameters to the reproduction execution unit 43.

The reproduction execution unit 43 controls the channel emulator 3 based on the parameters input from the parameter generation unit 42 so as to perform processing of forming a transmission space having the propagation characteristics to be reproduced in the reverberation chamber 2.

The following will describe a method of reproducing a transmission space having predetermined radio wave propagation characteristics to be reproduced in the reverberation chamber 2 and evaluating the characteristics of the measurement object 20. FIG. 3 is a diagram illustrating a method of reproducing a transmission space having predetermined radio wave propagation characteristics to be reproduced in the reverberation chamber 2 and evaluating the characteristics of the measurement object 20.

As illustrated in FIG. 3, at step 100 (S100), the propagation characteristics calculation unit 40 calculates propagation characteristics by simulation.

At step 102 (S102), the machine learning unit 41 forms a learning model for the propagation characteristics and parameters input from the propagation characteristics calculation unit 40 by machine learning using actually measured propagation characteristics and parameters.

At step 104 (S104), when the propagation characteristics to be reproduced are input, the parameter generation unit 42 generates parameters corresponding to the propagation characteristics to be reproduced using the learning model input from the machine learning unit 41.

At step 106 (S106), the reproduction execution unit 43 controls the channel emulator 3 based on the parameters input from the parameter generation unit 42 so as to perform processing of forming a transmission space having the propagation characteristics to be reproduced (reproducing a pseudo propagation environment) in the reverberation chamber 2.

That is, with the processing performed at S100 to S106, it is possible to reproduce a desired transmission space.

Then, at step 108 (S108), the characteristics of the measurement object 20 are evaluated in the reverberation chamber 2 in which the propagation characteristics are reproduced.

As described above, with the transmission space reproduction device 1, it is possible to reproduce a pseudo propagation environment in the reverberation chamber 2. That is, the transmission space reproduction device 1 can easily reproduce a transmission space.

For example, the transmission space reproduction device 1 can reproduce a real environment in the reverberation chamber 2 by performing machine learning on propagation characteristics in a real environment such as arrival directions of radio waves and determining an installation place of the reflector 23 and the like in the reverberation chamber 2.

Note that some or all of the functions of each of the channel emulator 3 and the control server 4 may be configured by hardware such as a programmable logic device (PLD) or a field programmable gate array (FPGA), or may be configured as a program executed by a processor such as a CPU.

For example, the channel emulator 3 and the control server 4 can be implemented by using a computer and a program, and the program can be recorded on a storage medium or provided via a network.

Figure 4:
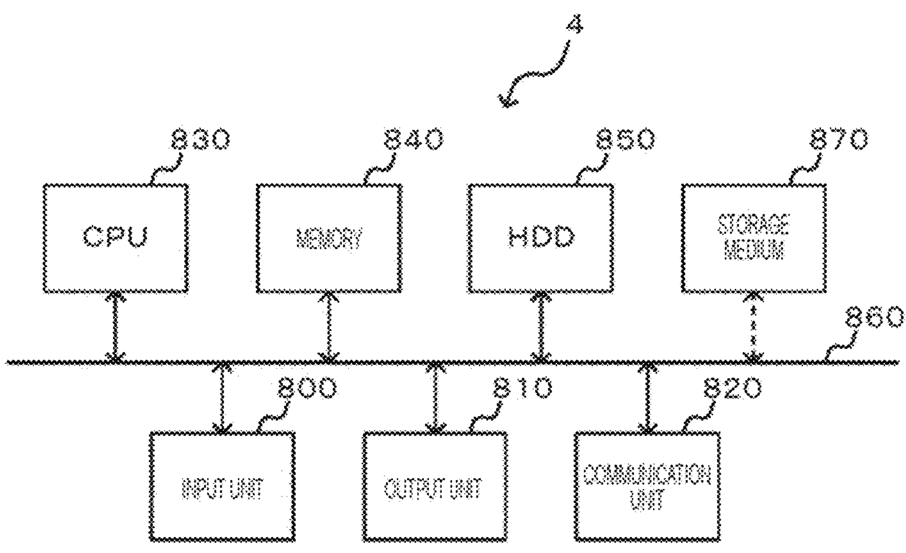
FIG. 4 is a diagram illustrating a hardware configuration example of the control server.

FIG. 4 is a diagram illustrating a hardware configuration example of the control server 4. As illustrated in FIG. 4, for example, the control server 4 has a function as a computer in which an input unit 800, an output unit 810, a communication unit 820, a central processing unit (CPU) 830, a memory 840, and a hard disk drive (HDD) 850 are connected via a bus 860. Moreover, the control server 4 can input and output data to and from a computer-readable storage medium 870.

The input unit 800 is, for example, a keyboard, a mouse, or the like. The output unit 810 is, for example, a display device such as a display. The communication unit 820 is, for example, a network interface or the like.

The CPU 830 controls each unit forming the control server 4, and performs predetermined processing and the like. The memory 840 and the HDD 850 are storage units that store data and the like.

The storage medium 870 can store programs and the like for executing the functions of the control server 4. Note that the architecture of the control server 4 is not limited to the example illustrated in FIG. 4.

REFERENCE SIGNS LIST

1 transmission space reproduction device
2 reverberation chamber
3 channel emulator
4 control server
20 measurement object
21 placing table
22 transmission antenna
23 reflector
40 propagation characteristics calculation unit
41 machine learning unit
42 parameter generation unit
43 reproduction execution unit
800 input unit
810 output unit
800 communication unit
830 CPU
840 memory
850 HDD
860 bus
870 storage medium

The invention claimed is:

1. A transmission space reproduction method comprising:
simulating while sequentially changing a parameter in a reverberation chamber used to reproduce propagation characteristics so as to calculate propagation characteristics in the reverberation chamber;
forming a learning model for a calculated parameter by machine learning using actually measured propagation characteristics and parameters;
generating a parameter corresponding to propagation characteristics to be reproduced using the formed learning model; and
controlling a channel emulator based on the generated parameter so as to perform processing of forming a transmission space having the propagation characteristics to be reproduced in the reverberation chamber.

2. The transmission space reproduction method according to claim 1, wherein in simulating, the simulation is performed while further changing a parameter of a dynamic reflector that is provided in the reverberation chamber and is capable of controlling phases of arrival waves when reflecting radio waves so as to calculate the propagation characteristics in the reverberation chamber.

3. The transmission space reproduction method according to claim 1, wherein in the simulating, the parameter that is sequentially changed includes at least one of a shape, a size, or a material of the reverberation chamber, a transmission location, a transmission signal, or a transmission beam direction by a transmission antenna, or a reception location or a reception signal by a measurement object.

4. The transmission space reproduction method according to claim 1, wherein the simulating is performed using a ray tracing method or a finite-difference time-domain method.

5. The transmission space reproduction method according to claim 1, wherein the forming the learning model is performed by machine learning using the calculated propagation characteristics, the calculated parameter, and the actually measured propagation characteristics and parameters.

6. The transmission space reproduction method according to claim 1, wherein the generating the parameter corresponding to the propagation characteristics to be reproduced comprises inputting the propagation characteristics to be reproduced into the formed learning model.

7. The transmission space reproduction method according to claim 1, wherein the propagation characteristics include at least one of reception power, a polarization ratio of an incident field, delay time, arrival direction, delay spread, angular spread, or a number of clusters.

8. A transmission space reproduction device comprising:

a propagation characteristics calculation circuitry configured to perform simulation while sequentially changing a parameter in a reverberation chamber used to reproduce propagation characteristics so as to calculate propagation characteristics in the reverberation chamber;

a machine learning circuitry configured to form a learning model for a parameter calculated by the propagation characteristics calculation circuitry by machine learning using actually measured propagation characteristics and parameters;

a parameter generation circuitry configured to generate a parameter corresponding to propagation characteristics to be reproduced using the learning model formed by the machine learning circuitry; and a reproduction execution circuitry configured to control a channel emulator based on the parameter generated by the parameter generation circuitry so as to perform processing of forming a transmission space having the propagation characteristics to be reproduced in the reverberation chamber.

9. The transmission space reproduction device according to claim 8, wherein the propagation characteristics calculation circuitry performs the simulation while further changing a parameter of a dynamic reflector that is provided in the reverberation chamber and is capable of controlling phases of arrival waves when reflecting radio waves so as to calculate the propagation characteristics in the reverberation chamber.

10. The transmission space reproduction device according to claim 8, wherein the parameter that is sequentially changed by the propagation characteristics calculation circuitry includes at least one of a shape, a size, or a material of the reverberation chamber, a transmission location, a transmission signal, or a transmission beam direction by a transmission antenna, or a reception location or a reception signal by a measurement object.

11. The transmission space reproduction device according to claim 8, wherein the propagation characteristics calculation circuitry performs the simulation using a ray tracing method or a finite-difference time-domain method.

12. The transmission space reproduction device according to claim 8, wherein the machine learning circuitry forms the learning model by machine learning using the calculated propagation characteristics, the calculated parameter, and the actually measured propagation characteristics and parameters.

13. The transmission space reproduction device according to claim 8, wherein the parameter generation circuitry generates the parameter corresponding to the propagation characteristics to be reproduced by inputting the propagation characteristics to be reproduced into the learning model formed by the machine learning circuitry.

14. The transmission space reproduction device according to claim 8, wherein the propagation characteristics include at least one of reception power, a polarization ratio of an incident field, delay time, arrival direction, delay spread, angular spread, or a number of clusters.

* * * * *